Nov. 8, 1949   C. DE CARLO   2,487,108
HURRICANE-PROOF WINDOW
Filed June 12, 1947
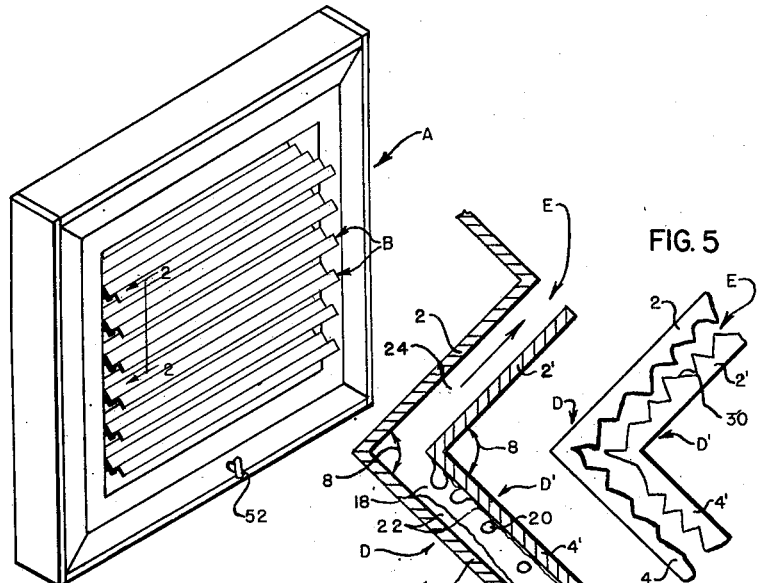
FIG. 1
FIG. 5
FIG. 4
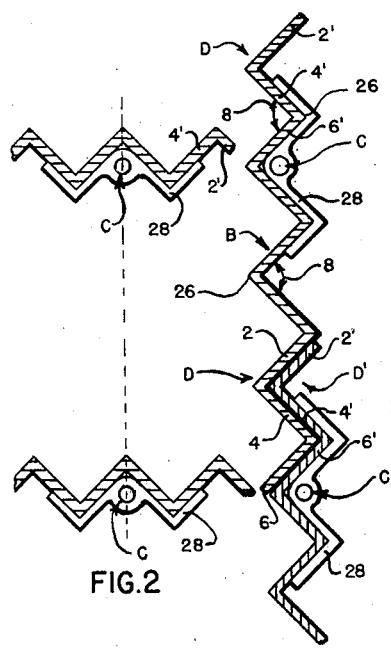
FIG. 2
FIG. 3
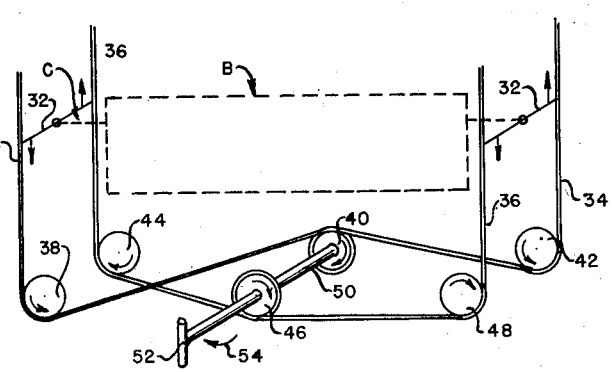
FIG. 6
INVENTOR
CAESAR DE CARLO
BY
James & Franklin
ATTORNEY Patented Nov. 8, 1949

2,487,108

UNITED STATES PATENT OFFICE 2,487,108

HURRICANE-PROOF WINDOW

Caesar De Carlo, Hato Rey, P. R., assignor to Raquel De Carlo, Hato Rey, P. R.

Application June 12, 1947, Serial No. 754,160

3 Claims. (Cl. 20—62)

The present invention relates to a louvre type window of improved construction.

Windows of the louvre or Miami type differ from conventional windows in that they contain no glass panes but are instead composed of a plurality of movable louvres which may be opened to permit free passage of air therethrough and which may be closed in inclement weather to keep out the rain and the wind. Such windows, as their name implies, find their greatest field of use in climates where the all-year-round temperature is so mild as to make insulating panes unnecessary.

In such climates it is also often the case that periodic high winds, often of hurricane force, are encountered, usually accompanied by heavy rain the drops of which are carried by the storm winds at considerable rates of speed up to 100 miles per hour and more. When windows of the louvre type are employed, it is necessary that they not only freely admit the passage of air and sunshine during the prevailing periods of good weather but that they also serve to prevent the entry into the house of wind and rain during the storm periods. The magnitude of this problem can be appreciated only when the full force of a hurricane wind which carries driving rain has been personally experienced.

In the past attempts had been made to solve this problem by causing the louvres, when in their closed position, to overlap and make positive mechanical contact one with the other all along their length, the contact thus formed serving as a weather seal to keep out the storm winds. This type of construction presents two major drawbacks. One is that when it works, that is to say, when the mechanical sealing between the overlapping louvres is effected, no air at all will enter the house. The other drawback is that a perfect mechanical seal is never attained due to warpage and designing difficulties plus ordinary wear and tear. It is therefore, from a practical point of view, impossible to maintain sealing engagement between the louvres over any considerable period of time, and consequently the windproof characteristic of such windows is at best only temporary, if it is ever attained at all. When the wind seal is not effected, the wind howls through the unsealed areas, carrying with it considerable moisture which is then deposited inside the room. Such windows work either too well—the seal, if effected, resulting in a stifling of the interior of the house—or not at all—resulting in the entry of rain into the house.

It is the prime object of the present invention to devise a louvre type window construction which, when closed to keep out the rain, will at the same time permit the entry of air into the interior of the house furnished with said windows yet which will at the same time, even when the wind velocity is of hurricane magnitude, ensure that all moisture or rain entrained in the air will be deposited therefrom prior to the entry of the air into the house. By this construction, therefore, a window is provided which, when in open position, will permit the free entry of air and sunshine into the house and, when in closed position, will permit the entry of air at very low velocity into the house but will not permit the entry of rain thereinto.

This primary objective is accomplished by so constructing the louvres that when they are in closed position they overlap one another and form between one another a sinuous and narrow air passage through which air may pass at ever decreasing velocities and in which any rain which the air may be carrying is deposited before the air has passed therethrough to the interior of the house.

It is a further object of the present invention, therefore, to provide a louvre type window which, when in closed position, forms or defines a plurality of rain catching air passages.

It is yet another object of the present invention to provide such a window which is both architecturally pleasing in appearance and which also, in good weather, provides a certain amount of heat protection.

To the accomplishment of the foregoing objects and such other objects as may hereinafter appear, the present invention relates to a hurricane-proof louvre window construction as defined in the appended claims and as set forth in this specification, taken together with the accompanying drawings, in which:

Fig. 1 is a perspective view of a window of the present invention, showing the louvres in open position;

Fig. 2 is a cross-sectional view of a portion thereof taken along the line 2—2 of Fig. 1;

Fig. 3 is a view similar to Fig. 2 but showing the louvres in closed position;

Fig. 4 is a view on a considerably enlarged scale showing the overlapping portions of the louvres when in closed position and illustrating the action of the air passages formed thereby on wind passing therethrough;

Fig. 5 is a fragmentary view similar to Fig. 4 but illustrating an alternative embodiment of louvre surface; and Fig. 6 is a diagrammatic view illustrating one embodiment of the mechanism employed to move the louvres.

The window of my invention comprises a frame, generally designated A, in which a plurality of louvres generally designated B are mounted so as to be movable between open and closed positions in the former of which air and light are freely passable therethrough and in the latter of which air is passable therethrough only with difficulty and rain is not passable therethrough. In the embodiment here illustrated, the louvres B are pivotable about horizontal axes or shafts C, a rotation of 90° about shaft C serving to move the louvres from their open position shown in Fig. 2 to their closed position shown in Fig. 3.

The sizes of the louvres B are so related one to the other and to the distances between the shafts C that, when the louvres B are in their vertically partially overlapped or closed position, each will partially overlap the louvre adjacent thereto, the overlapping portions being designated generally by the letters D and D'. It is of importance to note that these overlapping portions D and D' preferably do not touch one another or, if they do touch, do so only over a minor portion of their adjacent surfaces. As a result, an air passage or space generally designated E and best shown in Figs. 4 and 5 is defined between the adjacent surfaces of the overlapping portions D and D' for the ingress of air therethrough and it is through this air passage that air may pass through the window and enter a room even when the louvres B are in closed position.

In still air any drops of condensed moisture such as rain drops will, because of their own weight, fall. When the air is in motion, the drops will tend to be carried by the air and consequently if air in motion carrying entrained rain drops is permitted to enter a room the rain will be carried in with it and thus cause damage to the interior of the room. My window construction permits air to enter the room yet ensures that any entrained moisture drops in the air will be deposited therefrom before the air enters the room, this being accomplished by so forming the air passage E that it is both sinuous and constricted, the sinuosity and constricted nature of the air passage E acting through change of direction and friction respectively to cause the velocity of the air to fall considerably as the air passes therethrough. It is only when the velocity of the air has been decreased to a degree sufficient to ensure that all entrained drops of moisture have been deposited therefrom that the air is permitted to enter the room. The air passage E is also so constructed that the moisture deposited therein by the air is permitted to fall to the exterior of the window, thus preventing its entry into the room.

To this end, the overlapping portions D and D' of the louvres B are provided with a plurality of abruptly reversely bent portions here shown as three in number, 2, 4 and 6 and 2', 4' and 6' respectively. In other words, the louvres B, when in the partially-overlapped position have at least one substantially V-shaped corrugation or projection of each louvre nested within at least one substantially V-shaped corrugation or projection of an adjacent louvre and slightly spaced therefrom to form the sinuous passage E for the ingress of air therethrough. It will be apparent that the number of reversely bent portions and the abruptness of the reverse bends formed therein may be varied, as may the width of the constricted air passage E, the greater the width of the air passage E, the greater the number of reversely bent portions and/or the more abrupt the reverse bends must be in order that winds of hurricane force may be suitably controlled and confined. I have found from actual experience that when the clearance between the overlapping portions D and D', that is to say, the width of the air passage E, is on the order of $\frac{1}{16}$ or $\frac{1}{32}$ of an inch, a minimum of three reverse bends having interior angles 8 of 90° or less are necessary if the window is to be hurricane-proof. By that I mean that if the overlapping portions D and D' are constructed as above described, a wind of hurricane force impinging upon the exterior of the window will, by the time it has traversed the entire air passage E and has undergone two right angle changes of direction and has in addition been frictionally slowed by the constricted area of the passage E, have had its velocity reduced almost to zero before it enters the room and that consequently it will have deposited all of its entrained moisture drops in the air passage E.

The effect of the air passage E on the wind has been diagrammatically illustrated in Fig. 4. The wind on the exterior of the window is designated by the arrow 10. This wind normally has entrained within it a large number of small moisture drops 12. The lowermost portion 14 of the air passage E is disposed at an angle to the wind 10 and consequently that portion of the wind 10 which enters the mouth 15 of the air passage E must change its direction to enter and consequently is somewhat slowed. The wind continues up the portion 14 of the passage E, the constricted nature of the passage causing it to lose still more of its velocity. When this occurs, a small proportion of the moisture drops 12 will be deposited on the interior surfaces of the louvre portions 6 and 6' and a larger proportion of those drops 12 will merge with one another to form somewhat larger drops 16. The wind then reaches the first reverse bend of the passage E and, because of its change of direction, its velocity is once again considerably reduced and as it passes up through the portion 18 of the passage E, its speed is once more frictionally reduced. By this time, most of the moisture drops entrained within the wind will have formed themselves into relatively large drops 20 which, by reason of their weight, will be deposited on the interior surfaces of the louvre portions 4 and 4' and will run down those surfaces and the surfaces 6 and 6' to fall out of the mouth 15 of the passage E through which the wind is entering. It will be apparent that the presence of a film 22 of water running down the interior surfaces of the portions D and D' will still further restrict the area of the passage E through which the wind may pass and thus will serve to further slow the wind.

The effect of the second abrupt change in wind direction through the passage E and the constricted area of the portion 24 of the passage E acts cumulatively to the effects of the portions 14 and 18 thereof.

As here illustrated, the louvres B are made of sheet metal such as aluminum formed into a continuous zig-zag pattern, the interior angles 8 of the angular bends 26 of which are approximately 90°. Each louvre embodies a plurality of substantially V-shaped corrugations arranged parallel to each other and to the axis of the shaft C. Zig-zag brackets 28 fastened on the shafts C may be connected to the louvres B either by rivets or by brazing or welding so that rotation of the shafts will cause the louvres B to pivot thereabout. As here illustrated, the bends 26 are parallel to the shafts C. It will, of course, be apparent that many variations may be made in this arrangement consistent with the principles of my invention as above set forth. Thus, by way of example, the only portions of the louvres B which need assume the abruptly, reversely bent or zig-zag shape are those portions D and D' which overlap adjacent louvres when the louvres are in closed position; the remainder of the louvres may be flat or of any other configuration. Moreover, the zig-zag shape is not the only one which could be employed, waves or herringbones also imparting useful effects. It must be borne in mind, however, that much of the value of my construction is lost if the change of wind direction within the air passage E is made gradual rather than abrupt and consequently the employment of smoothly curved meshing surfaces having large radii of curvature is to be avoided. Also, while I have mentioned sheet aluminum as a desirable metal from which the louvres B may be made, it will be apparent that many other materials, such as other metals, plastic, pressed wood or ply wood, may also be employed.

A particular advantage attendant upon the employment of aluminum, apart from the fact that aluminum is particularly suited for fabrication into the zig-zag shape I prefer, is that such sheet aluminum has a bright and reflective surface so that any sunlight which impinges thereon will be reflected in most part. This will aid in maintaining the interior of the room at as low a temperature as possible. Moreover, in the case of corrugated aluminum, or aluminum of zig-zag configuration, the sun rays thus reflected are scattered in various directions and consequently the vision of a passer-by will not be blinded by the reflection.

Fig. 5 illustrates a modification of my invention in which the interior surfaces of the overlapping portions D and D' are provided with a large number of preferably minute projections 30, which projections, whether or not they meet and touch the projections from the opposing interior surfaces, serve to further constrict the area of the air passage E and consequently further reduce the velocity of the wind passing therethrough. They also serve to facilitate the deposition of moisture entrained in the wind, the projecting points 30 acting as collection points on which drops may form.

I have illustrated in Fig. 6 a simplified mechanism for pivoting the louvres B between their open and closed positions. This mechanism forms no part of my present invention and is but typical of many ways in which the louvres may be rotated. To each end of the shaft C is attached a bar 32 the extremities of which are in turn attached to cables 34 and 36. Cable 34 passes over pulley 38, is wrapped around driving wheel 40 and then passes over pulley 42. Cable 36 passes over pulley 44, is wrapped around driving wheel 46 and then passes over pulley 48. The two driving wheels 40 and 46 are each attached to shaft 50 which is provided at its extremity with an operating handle 52 which projects out through the window frame A. Rotation of the operating handle 52 in the direction of the arrow 54 will cause the driving wheels and the pulleys to rotate in the directions indicated by the arrows and therefore will cause the bars 32 to pivot in the direction indicated by the arrows attached thereto, thus imparting similar pivotal motion to the louvres B.

While the louvres are here shown arranged horizontally and having a permissible motion of approximately 90° between open and closed position, it will be apparent that these details, too, may be varied at will, the louvres being arrangeable vertically and, if desired, the louvres being given 180° freedom of pivotal motion.

By the construction above described, I have devised a louvre type window which may be opened to permit the free passage of air therethrough and which when closed will not completely cut off entry of air into the room but will instead permit air to enter the room at low enough velocities so that it will not enter the room at wind strength and so that any entrained rain drops in the air will be deposited to pass to the exterior of the window before the air enters the room, all of this being accomplished even though the wind force be of hurricane strength. The advantages of such a construction over prior constructions, which either completely sealed the room rendering the interior thereof extremely stuffy, or permitted the entry of said rain when the wind velocity attained a sufficient strength, will be apparent. It will also be clear that while those prior art windows which were hurricane-proof attained that result by the effectuation of positive seals which required careful alignment for their realization, which alignment was impossible to maintain over any substantial period of time, my arrangement does not depend upon such precise adjustments, the overlapping portions D and D' being so constructed and the air passage E therebetween being so defined that variations in the meshing of the portions D and D' within the limits to be expected in normal use are not critical.

It will be apparent that, within the limits set forth by the preceding discussion, many changes may be made in the details of design of my window without departing from the spirit of the invention as defined in the following claims.

I claim:

1. A hurricane-proof window comprising a frame, a plurality of louvres arranged in superimposed spaced relation within said frame, each louvre being mounted in said frame for rotatable movement about a horizontal axis into and out of a vertically partially-overlapped position with respect to each other, and means operatively connected to said louvres for effecting the rotatable movement of the latter, each of said louvres embodying a plurality of corrugations arranged parallel to each other and to said axis, said louvres when in the partially-overlapped position having the corrugations of each louvre nested within the corrugations of an adjacent louvre and slightly spaced therefrom to form a sinuous passage for the ingress of air therethrough, whereby the velocity of the air flowing through the passage is reduced to a degree such as to permit any rain droplets suspended in said air to be deposited in said passage.

2. A hurricane-proof window comprising a frame, a plurality of louvres arranged in superimposed spaced relation within said frame, each louvre being mounted in said frame for rotatable movement about a horizontal axis into and out of a vertically partially-overlapped position with respect to each other, and means operatively connected to said louvres for effecting the rotatable movement of the latter, each of said louvres embodying a plurality of substantially V-shaped corrugations arranged parallel to each other and to said axis and connected together, said louvres when in the partially-overlapped position having the corrugations of each louvre nested within the corrugations of an adjacent louvre and slightly spaced therefrom to form a sinuous passage for the ingress of air therethrough, whereby the velocity of the air flowing through said passage is reduced to a degree such as to permit any rain droplets suspended in said air to be deposited in said passage.

3. A hurricane-proof window comprising a frame, a plurality of louvres arranged in superimposed spaced relation within said frame, each louvre being mounted in said frame for rotatable movement about a horizontal axis into and out of a vertically partially-overlapped position with respect to each other, and means operatively connected to said louvres for effecting the rotatable movement of the latter, each of said louvres embodying a plurality of substantially V-shaped corrugations arranged parallel to each other and to said axis, said louvres when in the partially-overlapped position having the corrugations of each louvre nested within corrugations of an adjacent louvre and slightly spaced therefrom to form a sinuous passage for the ingress of air therethrough, the confronting surfaces of the latter-named corrugations being each provided with a plurality of protuberances to increase the restriction and sinuosity of said air passage, whereby the velocity of the air flowing through said passage is reduced to a degree such as to permit any rain droplets suspended in said air to be deposited in said passage.

CAESAR DE CARLO.

REFERENCES CITED

The following references are of record in the file of this patent:

UNITED STATES PATENTS

| Number | Name | Date |
| --- | --- | --- |
| 704,022 | Friesdorf | July 8, 1902 |
| 1,118,365 | Loehler | Nov. 24, 1914 |
| 1,798,663 | Fitzpatrick et al. | Mar. 31, 1931 |
| 2,103,788 | Mohifeld | Dec. 28, 1938 |